United States Patent
Fuhrmann et al.

(10) Patent No.: US 6,877,350 B2
(45) Date of Patent: Apr. 12, 2005

(54) HUB MEMBER AND SHAFT JOURNAL ASSEMBLY AND METHOD

(75) Inventors: Peter Fuhrmann, Lohmar (DE);
Herbert Frielingsdorf, Lohmar (DE);
Volker Hainz, Heusenstamm (DE);
Jean Spolmayeur, Guecelard (FR)

(73) Assignee: GKN Automotive GmbH (DE)

( * ) Notice: Subject to any disclaimer, the term of this patent is extended or adjusted under 35 U.S.C. 154(b) by 2 days.

(21) Appl. No.: 10/304,435

(22) Filed: Nov. 26, 2002

(65) Prior Publication Data

US 2003/0130048 A1 Jul. 10, 2003

(30) Foreign Application Priority Data

Dec. 5, 2001 (DE) ......................................... 101 59 776

(51) Int. Cl.⁷ ................................................. B21J 5/12
(52) U.S. Cl. ........................ 72/354.2; 72/355.4; 72/399
(58) Field of Search ............................. 72/354.2, 353.2, 72/355.4, 352, 354.6, 358, 359, 399; 29/558, 898.059, 898.13

(56) References Cited

U.S. PATENT DOCUMENTS

| | | | | |
|---|---|---|---|---|
| 4,319,478 A | * | 3/1982 | Yoshioka | 72/356 |
| 4,843,864 A | * | 7/1989 | Welschof | 72/353.4 |
| 6,044,684 A | * | 4/2000 | Ohama et al. | 72/354.2 |
| 6,119,329 A | * | 9/2000 | Stall et al. | 29/557 |
| 6,641,680 B2 | * | 11/2003 | Nishimori et al. | 148/229 |
| 6,665,936 B1 | * | 12/2003 | Kochsiek | 29/898.066 |

FOREIGN PATENT DOCUMENTS

DE  42 40 131 C2  6/1994

OTHER PUBLICATIONS

Jütte, Friedhelm; Fließpressen von Verzahnungen mit hoher Genauigkeit ist eine Alternative zum Spanen; pp. 20–22; 1999.
Rolf, Bernhard; Drückwalzverfahren rationalisiert Fertigung von verzahnten Werkstücken; pp. 20–23.
Krapfenbauer, H.; Neue Kaltwalzverfahren zur Herstellung verzahnter Hohlteile; pp. 21–23; 1994.

* cited by examiner

Primary Examiner—Kenn Thompson

(57) ABSTRACT

A production method involving forming an inner joint part of a constant velocity universal ball joint in the form of a hub member (11) which comprises a central through-aperture (14) with inner toothing (16) for receiving a shaft journal (12), and ball tracks (15) for receiving torque transmitting balls on the outer circumference, wherein a blank with largely finish-formed ball tracks is produced by non-chip-forming deformation; wherein, at the blank, outer surfaces and a smooth through-aperture (14) are finish-turned; and wherein, during simultaneous working stages, the ball tracks (15) are calibrated by non-chip-forming deformation and the inner toothing (16) in the through-aperture (14) is produced by pressing in a non-chip-forming way.

11 Claims, 7 Drawing Sheets

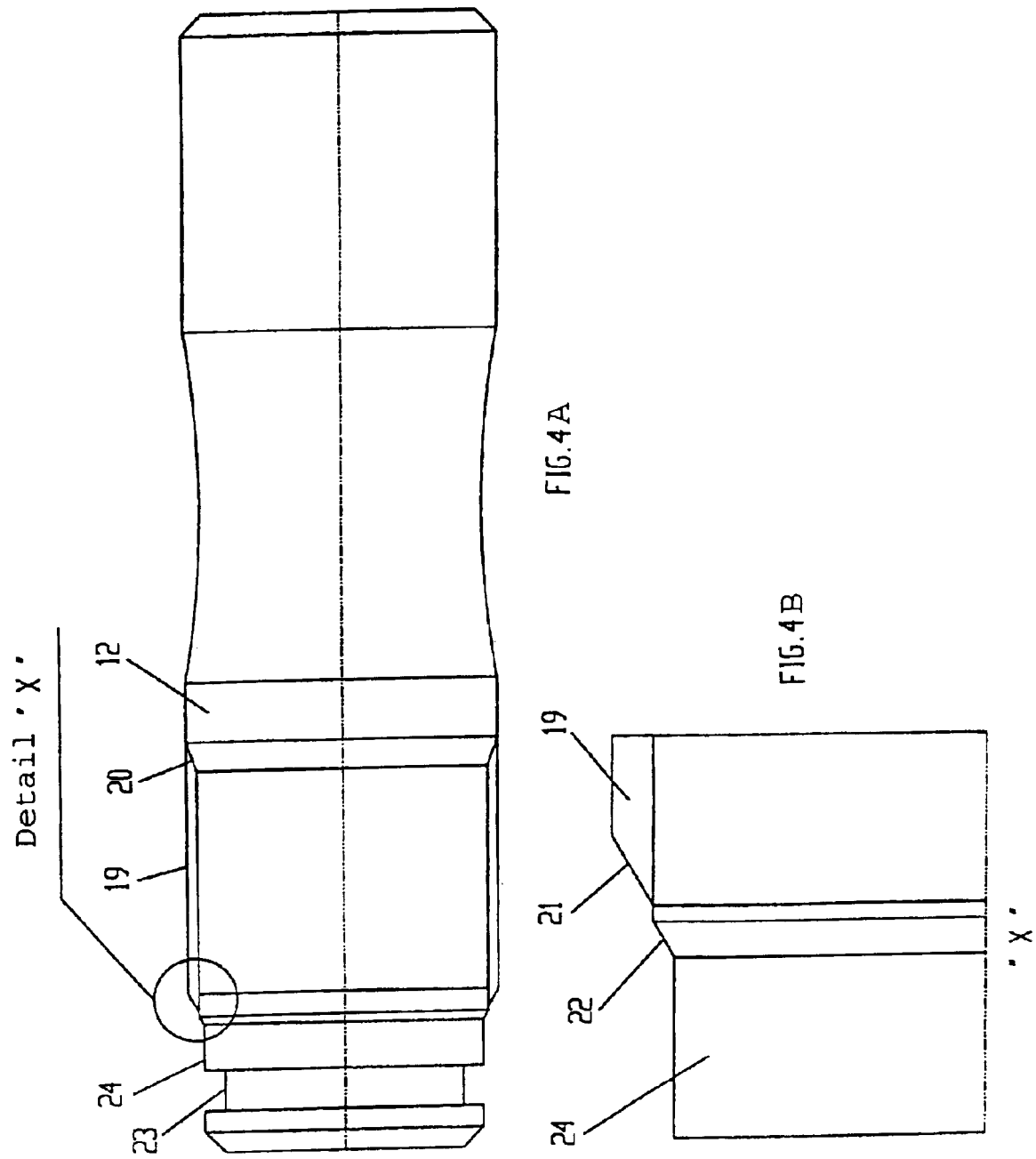

HUB MEMBER AND SHAFT JOURNAL ASSEMBLY AND METHOD

TECHNICAL FIELD

The invention relates to a process of producing, by forming and machining, an inner joint part of a constant velocity universal ball joint in the form of a hub member which comprises a central through-aperture with inner toothing for receiving a shaft journal, and tracks for receiving torque transmitting balls on the outer circumference. The invention further relates to a process for producing a shaft journal for being inserted into the above-mentioned inner joint part. Furthermore, the invention is referred to a hub member and shaft journal assembly.

BACKGROUND OF THE INVENTION

A connecting assembly between an inner joint part and an inserted driveshaft of the foregoing type is known from DE 42 40 131 C2. The inner toothing comprises a delimited axial length inside the through-aperture which continues on an untoothed portion. The end of the inner toothing serves as an axial stop for the shaft toothing of the inserted driveshaft. The inner toothing is produced in a blind hole in the inner joint part. The inner toothing can be produced only by introducing a toothing tool corresponding to the complete shaft toothing into the blind hole and by pressing the outer joint part on to the toothing tool through radial deformation. This requires a relatively high deformation rate involving high forces and a large amount of energy. An accurate position of the toothing run-out serving as a stop for the shaft toothing of the inserted shaft journal is also difficult to achieve.

SUMMARY OF THE INVENTION

It is therefore an object of the present invention to provide a method of producing an inner joint part of the initially mentioned type, which permits production with a reduced amount of energy and a greater degree of accuracy. The present invention provides a method involving process stages wherein a blank with largely finish-formed ball tracks is produced by non-chip-forming deformation; and wherein, at the blank, outer surfaces and a smooth through-aperture are finish-turned. The method also provides that, during simultaneous working stages, the ball tracks are calibrated by non-chip-forming deformation, and the inner toothing in the through-aperture is produced by pressing or profile slotting in a non-chip-forming way by a mandrel.

Because the shaft toothing is produced on a continuous through-aperture, the radial deformation rate is reduced. The substantially simultaneously performed calibration of the ball tracks by radial mechanical deformation and radial mechanical holding assures that neither of the two deformation processes has a disadvantageous affect on the dimensional accuracy of the respective other surfaces to be deformed. In other words, the production of the inner toothing does not lead to inaccurate track dimensions and the calibration of the ball tracks does not adversely affect the finish-dimensions of the inner toothing. In this way, subsequent machining can be avoided and a substantially higher degree of dimensional accuracy can be observed at the inner toothing and at the ball tracks. It is desirable that the inner joint part beheld in the clamping device, of the calibrating tool until the production of the inner toothing is complete.

According to one embodiment, the inner toothing is slotted in a predetermined limited length as far as a toothing run-out inside the through-aperture, with the through-aperture continuing in an untoothed portion. The toothing end of the inner toothing can serve as an axial stop for the shaft journal, so that there is need only for a securing element acting in the opposite direction, such as a securing ring at the projecting-through shaft end.

According to another method of the above-mentioned type, during calibrating and slotting, a workpiece holding device for the hub member serves as an axial stop for the tool used for profile slotting. In this way, the workpiece holding device becomes the reference and stop face for the workpiece on the one hand, and for the tool for producing the inner toothing on the other hand. This permits the toothing run-out to be produced with the greatest precision regarding its axial position in the workpiece.

According to a further method, the blank with the finish-formed ball tracks is produced by forging and, after the outer faces and the smooth through-aperture have been turned thereafter, the blank is deburred prior to being calibrated and, finally, the ball tracks, after having been calibrated, are induction-hardened only.

A method for producing a shaft journal for being inserted into the above-mentioned inner joint part includes the following process stages: at a distance from the shaft end, forming a first conical step which serves as a stop face relative to the toothing run-out of the inner toothing at the inner joint part, and a larger second conical step which is positioned at a greater distance from the shaft end and which forms the toothing end of the shaft toothing, wherein the shaft toothing from the first step to the toothing run-out is finished by being drawn through a die. In this way, the function of the stop of the shaft journal relative to the toothing run-out of the inner toothing of the hub member is taken over by a specially produced conical face which can be produced at an accurate axial distance from the securing mechanism, such as a groove provided for accommodating a securing ring. Said conical face is positioned at an axial distance from a second conical face which is to form the toothing end of the shaft toothing which is produced by drawing. Warping and the formation of burr or the like at the second conical face, which always occur at the start of the process of drawing the shaft toothing, thus cannot have an adverse effect on the positional accuracy of the stop face relative to the shaft end and thus of the shaft journal relative to the inner joint part. The shaft toothing is produced in a length which, in a finish-mounted position, extends beyond the through-aperture of the inner joint part, so that the accurate toothing length of the shaft toothing, which is very difficult to set during the drawing operation, is also without great significance.

An inventive device for carrying out the present method comprises a base plate on to which an inner joint part can be placed and on which there is supported a calibrating tool which can be fed in radially and which is divided into at least three parts, a mandrel which can be fed in axially and which is arranged coaxially relative to the calibrating tool and comprises approximately the diameter of the through-aperture and, close to its lower end, a forming crown of a short length for producing the inner toothing. It is thus possible to press the inner toothing without generating any adverse effects on the ball track shape. To be able to set the accurate position of the toothing run-out, the present invention also provides that the mandrel is lowered until it stops against the base plate and that the forming crown is arranged at a predetermined distance from the lower end of the mandrel. To further improve the accuracy of the toothing, the forming crown comprises in both axial directions pointing forming wedges.

One embodiment of an inventive assembly comprises an inner joint part and a shaft journal as well as illustrations of the inventive process, including an inventive device for carrying out the process.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIGS. 4A and 4B show a shaft journal according to FIG. 2 including a detailed portion of the shaft journal.

DETAILED DESCRIPTION OF THE INVENTION

Figure 1:
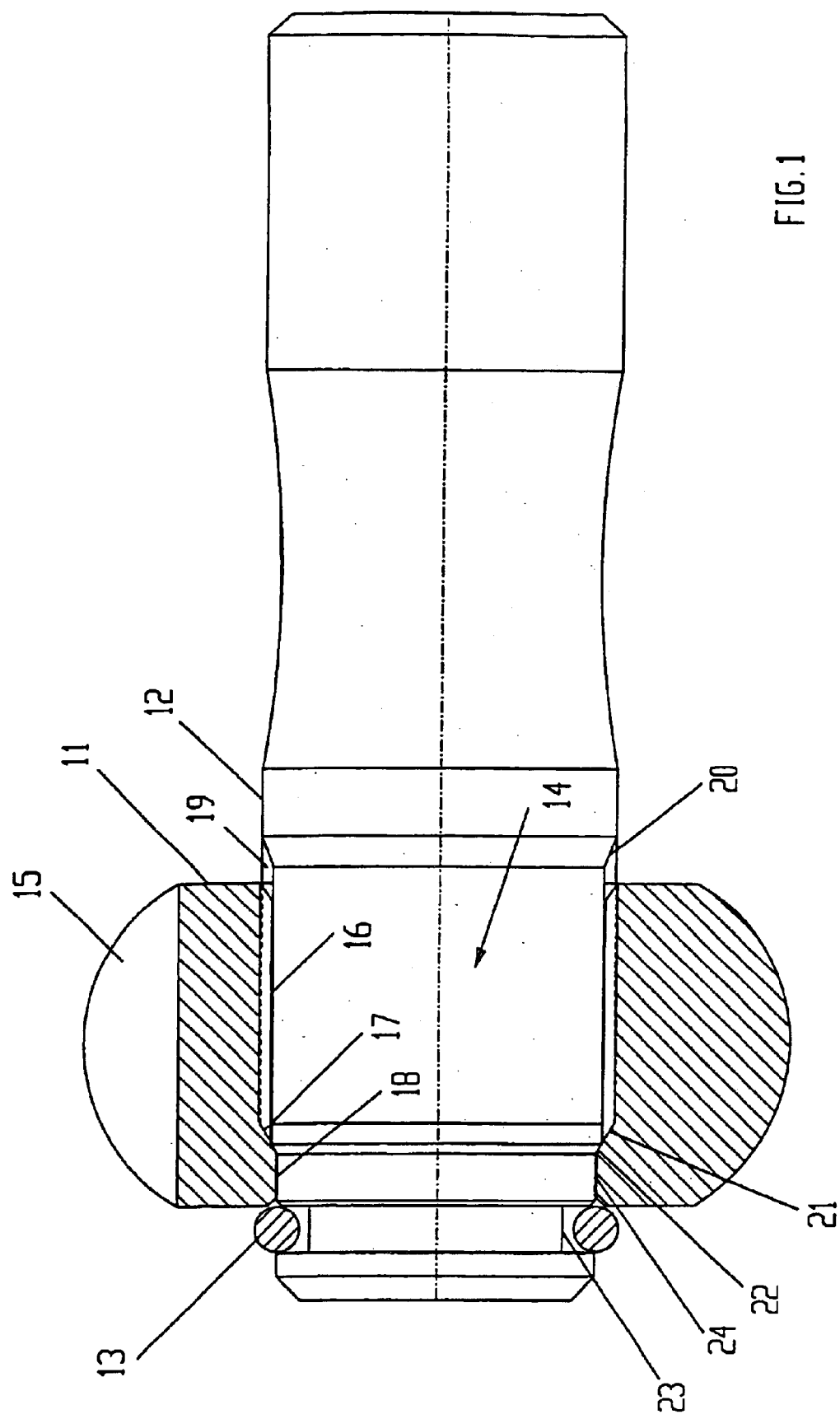
FIG. 1 shows a mounted assembly including an inner joint part and a shaft journal in accordance with one embodiment of the invention.

FIG. 1 shows an assembly including an inner joint part 11, a shaft journal 12 and a securing ring 13 in which the below-mentioned individual characteristics can be identified. The inner joint part 11 comprises a through-aperture 14 and ball grooves 15 for receiving torque transmitting balls. The through-aperture comprises a portion with an inner toothing 16, a run-out 17 of the shaft toothing as a well a smooth bore 18 with a reduced diameter. Into the hub member 11 there is inserted the shaft 12 whose shaft toothing 19 complements the inner toothing and whose toothing run-out 20 is positioned at a distance from the inner joint part. A stop cone 22 in front of the toothing start 21 is axially supported on the toothing run-out 17 of the inner toothing 16 of the inner joint part 11 to prevent the shaft journal 12 from being introduced further, which would be possible bearing in mind the toothing length. The stop cone is followed by a cylindrical portion 24 with a reduced diameter which engages the smooth bore 18 of the inner joint part. Further towards the shaft end, the cylindrical portion 24 comprises an annular groove 23 accommodating the securing ring 13 which rests against the end face of the inner joint part 11 and thus prevents the shaft journal 12 from being pulled out of the inner joint part 11. The annular groove 23 is deep enough such that, when the circumferentially slotted securing ring 13 is completely radially compressed, it disappears in the annular groove. In this way, when the securing ring is pre-fitted, the shaft journal 12 can be slid into the inner joint part 11.

Figure 2:
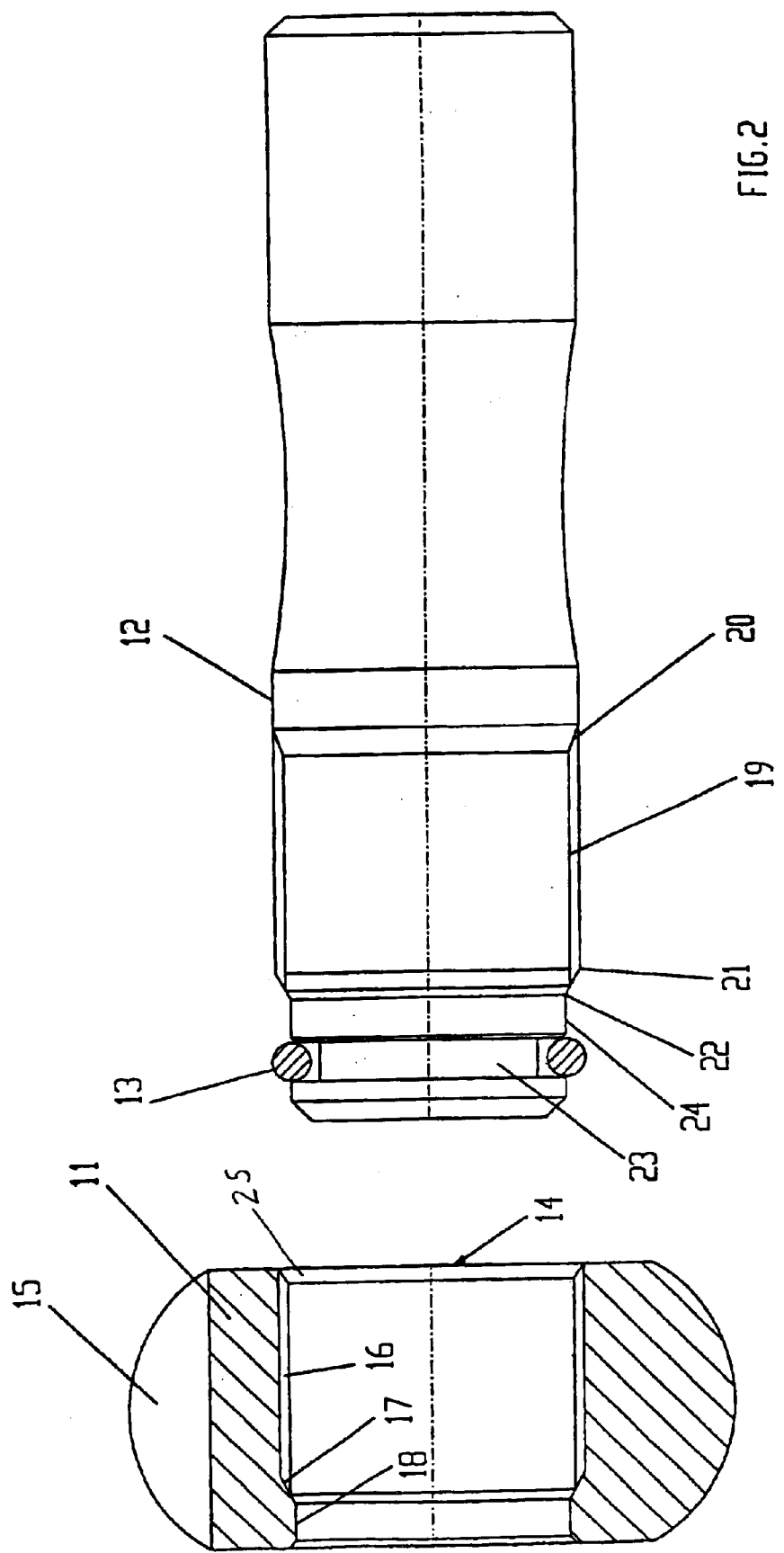
FIG. 2 shows the assembly according to FIG. 1 in a dismantled condition.

FIG. 2 shows these parts, i.e. the inner joint part 11, the shaft journal 12 and the securing ring 13 in the above-mentioned configuration prior to being assembled. When the shaft journal 12 is pressed into the inner joint part 11, the securing ring 13 is automatically compressed at the inner chamber 25 of the through-aperture 14 for assembly purposes and, after the shaft journal 12 has been passed through as far as the annular groove 23 included through the inner joint part 11, the securing ring 13 springs back out of said annular groove 23.

Figure 3:
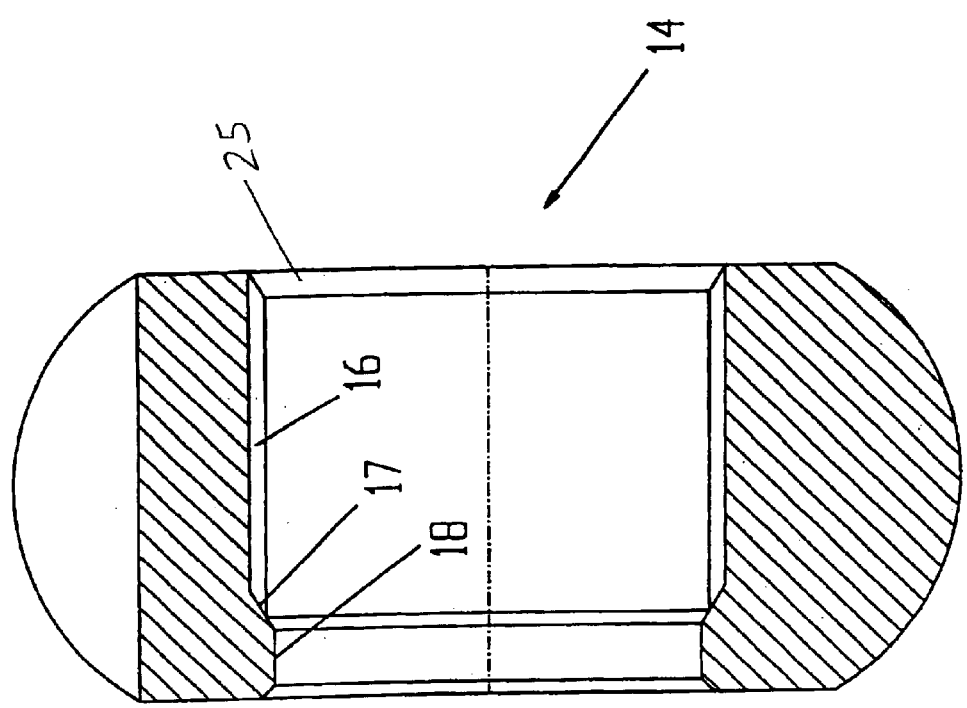
FIG. 3 shows an inner joint part according to FIG. 2 in the form of a detail.
Figure 5C:
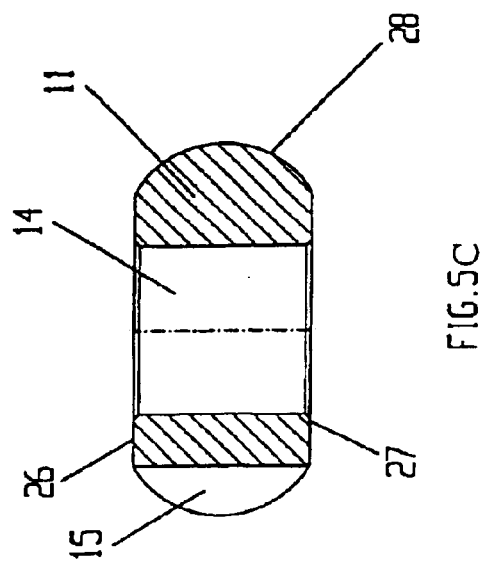
FIGS. 5A–5D show four production stages of the inner joint part in accordance with the invention.
Figure 5B:
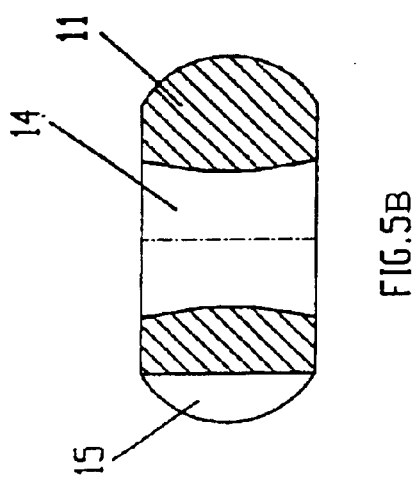
Figure 5A:
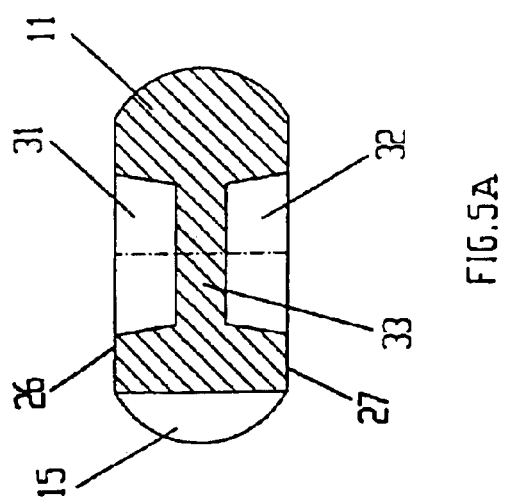
Figure 5D:
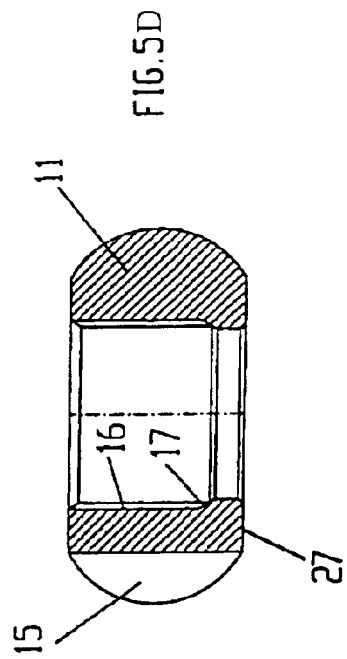

FIG. 3 shows the inner joint part as illustrated in FIG. 2 with the above-mentioned details. To that extent, reference is made to the above-mentioned description.

FIGS. 4A and 4B show the shaft journal 12 together with the details shown in FIG. 2, with the size of the detail X having been increased. It clearly shows that the contact cone 22, which delimits axial insertion, is axially offset from the toothing start 21, so that warping and the formation of burr at the toothing start, which occur when drawing the outer toothing 19, cannot adversely affect the positional accuracy of the contact cone 21 relative to the shaft end.

FIGS. 5A–5D show the inner joint part 11 during different production stages. Illustration 5A shows a forged inner joint part wherein the tracks 15 are largely finish-formed and wherein countersunk portions 31, 32 are formed in from the two end faces 26, 27 between which an intermediate wall 33 has remained.

Illustration 5B shows the next production stage wherein the above-mentioned intermediate wall has been pierced by a mandrel or the like, and the through-aperture 14 is open.

In illustration 5C, the through-aperture 14 has been turned out. Furthermore, the outer faces of the forged part, i.e. the end faces 26, 27 and the circumferential face 28, are finish-turned.

Illustration 5D shows the last production stage prior to the operation of hardening the ball tracks 15 and the toothing, wherein the ball tracks 15 are calibrated and wherein the inner toothing 16 is produced by non-chip forming deformation, with the distance between the toothing run-out 17 and the end face 27 being accurately dimensioned.

Figure 6:
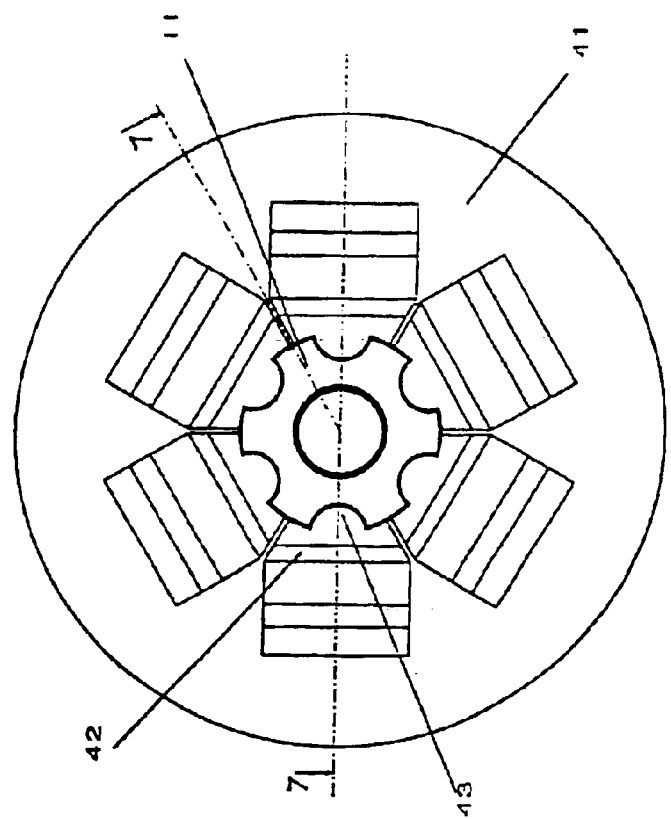
FIG. 6 shows an inner joint part with a calibrating tool and a drawing tool in a plan view.
Figure 7:
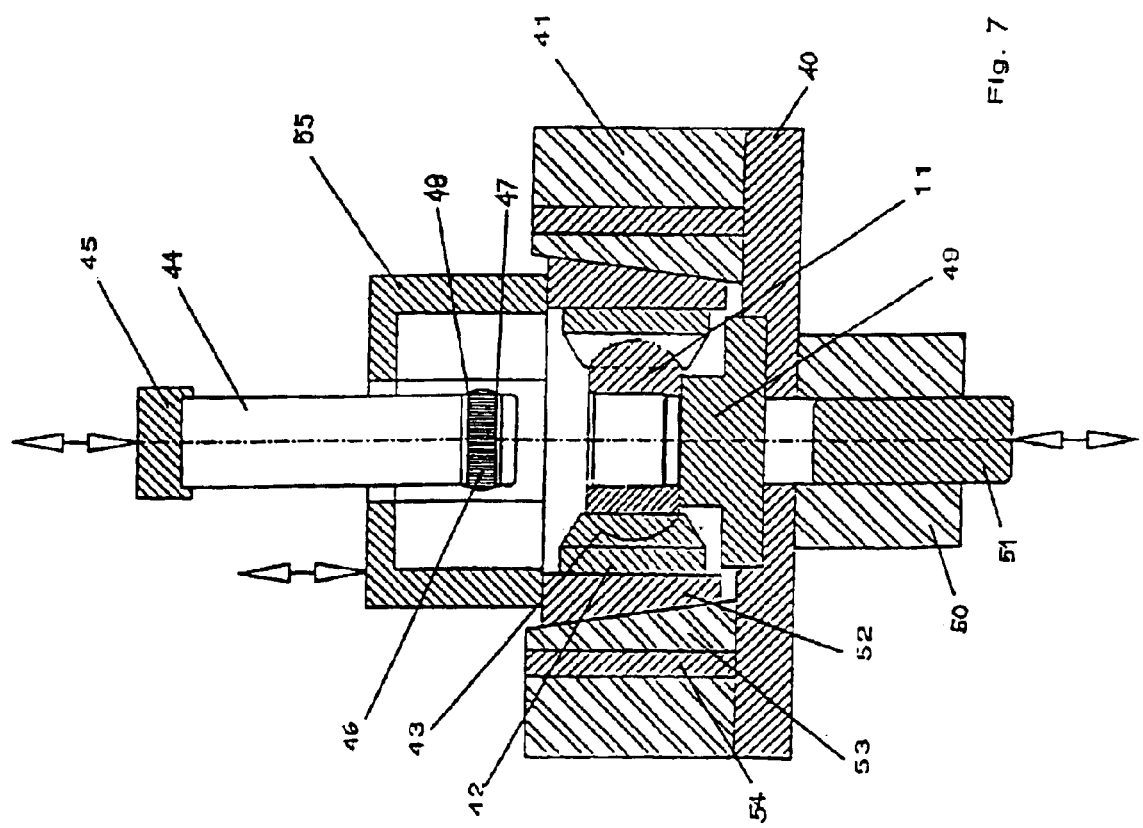
FIG. 7 shows an inner joint part with a calibrating tool and a drawing tool in an axial section along line 7—7 of FIG. 6.

FIGS. 6 and 7 show the tools for calibrating the ball tracks and for producing the inner toothing at an inner joint part 11. On the base plate 40 there is positioned a holding ring 41 and a workpiece holding device 49. Into the holding ring 41 there is inserted a six-part calibrating tool 42 which can be radially fed in by sets of wedge pieces 52, 53. The parts of the forming tool 42 are shown to comprise forming jams 43. Behind the sets of wedge pieces there are positioned exchangeable adjusting pieces 54. The inner wedge pieces 52 are acted upon by an axially adjustable pressure die 55. A central mandrel 44 is coaxially arranged relative to said pressure die in an axially adjustable holding device 45, which central mandrel 44 can be lowered through the inner joint part 11 as far as the supporting workpiece holding device 49. A forming crown 46 is arranged at an accurately determined level at the mandrel 44. The forming crown 46 comprises front forming wedges 47 which form the inner toothing at the inner joint part, as well as rear forming wedges 48 which facilitate the withdrawal of the mandrel 44. Underneath the workpiece holding device 49 there can be seen an axially adjustable ejector 51 in a guide 50. The ejector 51 can also lift the workpiece holding device 49 for tooling purposes.

Figure 8:
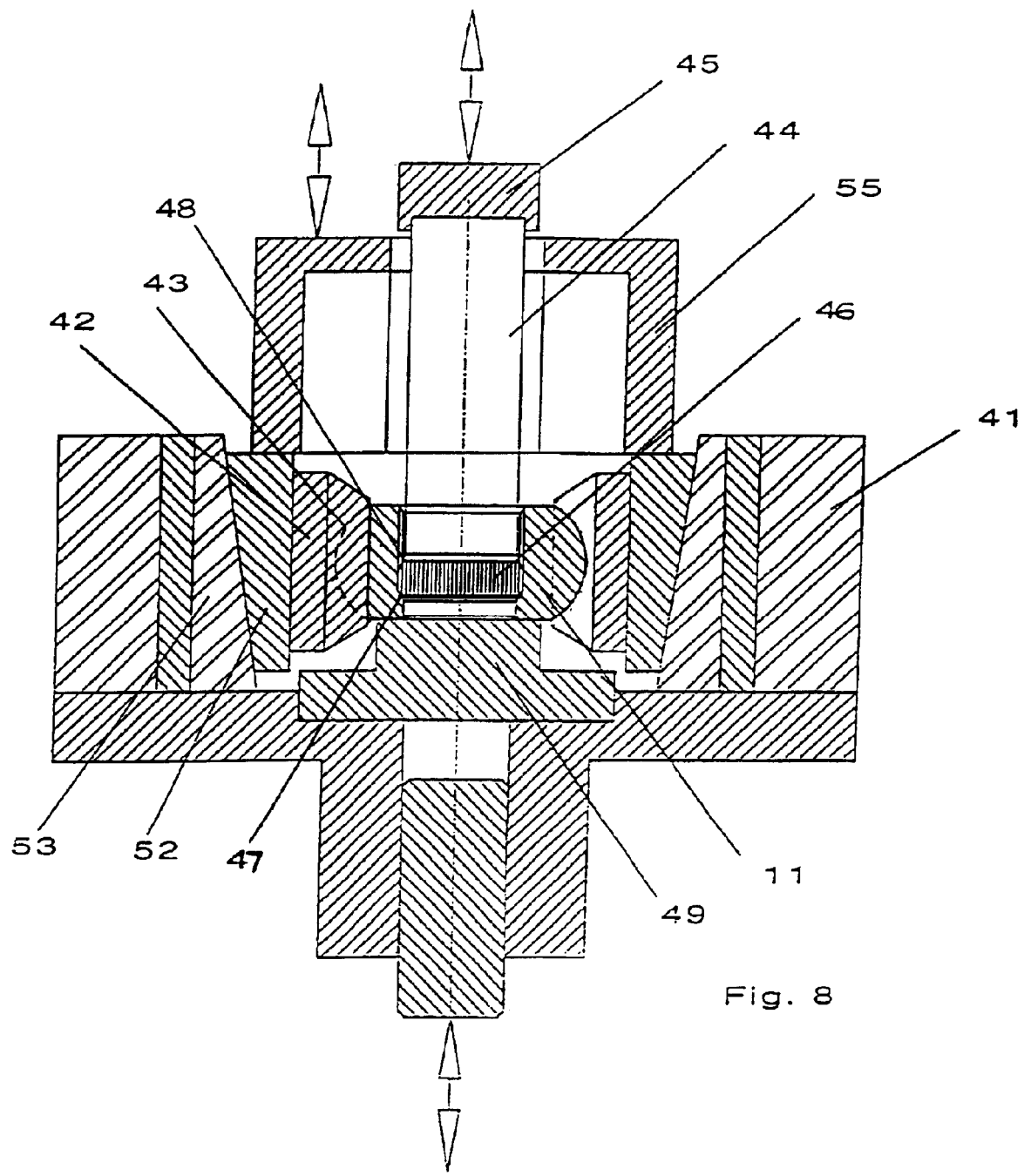
FIG. 8 shows the final stage of producing the inner joint part with the calibrating tool and the drawing tool in an axial section.

FIG. 8 is an axial section through an inner joint part 11 and of a set of tools which illustrates the stages of calibrating the ball tracks 15 and pressing the inner toothing 16. The inner joint part 11 has been inserted into the six-part calibrating tool 42. The parts of the calibrating tool 42 are shown to comprise the forming jaws 43. When the tool set is actuated by the pressure die 55, the forming jaws 43 are fed radially inwardly, so that the ball tracks 15 are calibrated. The inner joint part 11 is positioned on the workpiece holding device 49. Furthermore, the central mandrel 44 is shown in its holding device 45. The mandrel 44 has been lowered through the inner aperture 14 as far as the supporting workpiece holding device 49. At an accurately determined level, the mandrel 44 has been arranged at the forming crown 46 which, by means of front forming wedges 47, effects the forming of the inner toothing 16 and determines the accurate position of the toothing run-out 17 relative to the end face 27, with rear forming wedges 48 facilitating the withdrawal of the mandrel 44 while at the same time smoothing the inner toothing 16. After the mandrel 44 has been withdrawn and after the load on the pressure die 55 has been relieved, the ejector 51, by means of the workpiece holding device 49, is able to eject the inner joint part out of the forming jaws.

From the foregoing, it can be seen that there has been brought to the art a new and improved hub member and shaft journal assembly and method. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A method of producing an inner joint part of a constant velocity universal ball joint in the form of a hub member (11) which comprises a central through-aperture (14) with inner toothing (16) for receiving a shaft journal (12), and ball tracks (15) for receiving torque transmitting balls on the outer circumference, the method comprising:

producing by non-chip-forming deformation a blank with substantially finish-formed ball tracks;

finish turning at the blank, outer surfaces (26, 27, 28) and a smooth through-aperture (14); and simultaneously both calibrating the ball tracks (15) by non-chip-forming deformation, and producing by pressing or profile slotting in a non-chip-forming way the inner toothing (16) in the through-aperture (14).

2. A method according to claim 1, comprising compressing or profile slotting the inner toothing (16) in a predetermined limited length as far as a toothing run-out (17) inside the through-aperture (14).

3. A method according to claim 2, comprising, during calibrating and slotting, providing a workpiece holding device (49) for the hub member (11) serving as an axial stop for a tool (44) used for profile slotting.

4. A method according to claim 1, wherein the blank with the largely finish-formed ball tracks (15) is forged.

5. A method according to claim 1, comprising, after finish turning the blank, deburring the blank.

6. A method according to claim 2, comprising, after finish turning the blank, deburring the blank.

7. A method according to claim 3, comprising, after finish turning the blank, deburring the blank.

8. A method according to claim 1, comprising, after calibrating the ball tracks (15), induction-hardening the ball tracks (15).

9. A method according to claim 2, comprising, after calibrating the ball tracks (15), induction-hardening the ball tracks (15).

10. A method according to claim 3, comprising, after calibrating the ball tracks (15), induction-hardening the ball tracks (15).

11. A method according to claim 5, comprising, after calibrating the ball tracks (15), induction-hardening the ball tracks (15).

* * * * *